United States Patent [19]

Mattison

[11] Patent Number: 5,570,243
[45] Date of Patent: Oct. 29, 1996

[54] VARIABLE DELAY CIRCUIT INCLUDING CURRENT MIRROR AND RAMP GENERATOR CIRCUITS FOR USE IN THE READ CHANNEL OF A DATA STORAGE DEVICE

[75] Inventor: Rodney A. Mattison, Louisville, Colo.

[73] Assignee: Fujitsu Limited, Kanagawa, Japan

[21] Appl. No.: 430,592

[22] Filed: Apr. 28, 1995

Related U.S. Application Data

[62] Division of Ser. No. 902,073, Jun. 22, 1993.

[51] Int. Cl.$^6$ ................................................. G11B 5/09
[52] U.S. Cl. ........................................................ 360/51
[58] Field of Search ............................. 360/31, 32, 51, 360/67, 40, 45, 46; 327/158; 331/1 A, 2; 369/32, 49; 371/5.1; 375/354

[56] References Cited

U.S. PATENT DOCUMENTS

| | | | |
|---|---|---|---|
| 3,646,534 | 2/1972 | Miller | 360/40 |
| 4,578,721 | 3/1986 | Brannan, Jr. | 360/51 |
| 4,580,278 | 4/1986 | Yamamoto | 375/354 |
| 4,682,252 | 7/1987 | Smith | 360/67 |
| 4,726,022 | 2/1988 | Chan et al. | 371/5.1 |
| 4,764,913 | 8/1988 | Sasaki et al. | 369/49 |
| 4,799,112 | 1/1989 | Bremmer et al. | 360/31 |
| 4,809,088 | 2/1989 | Lofgren et al. | 360/31 |
| 4,825,321 | 4/1989 | Hassel et al. | 360/51 |
| 4,851,932 | 7/1989 | Scheer et al. | 360/51 |
| 4,858,034 | 8/1989 | Hassel et al. | 360/51 |
| 4,862,296 | 8/1989 | Murabayashi et al. | 360/51 |
| 4,879,608 | 11/1989 | Sano | 360/51 |
| 4,894,734 | 1/1990 | Fischler et al. | 360/51 |
| 4,918,677 | 4/1990 | Ashinuma et al. | 369/32 |
| 4,922,141 | 5/1990 | Lofgren et al. | 327/158 |
| 5,006,819 | 4/1991 | Buchan et al. | 331/1 A |
| 5,109,304 | 4/1992 | Pedersen | 360/51 |
| 5,142,420 | 8/1992 | Tanaka et al. | 360/32 |
| 5,325,241 | 6/1994 | Mattison et al. | 360/45 |

*Primary Examiner*—Aristotelis Psitos
*Assistant Examiner*—Patrick Wamsley
*Attorney, Agent, or Firm*—Curtis, Morris & Safford, P.C.

[57] ABSTRACT

A variable delay circuit, known as a delayed read data single shot (DRDSS) circuit, adapted for use in a data read channel which reads signals recorded with different clock frequencies in different zones on a data storage device, wherein the read channel includes a variable oscillator whose reactive impedance is supplied with a charging current whose level corresponds to the clock frequency of the zone being read. A current duplicator produces an output current that is a substantially identical duplicate of the charging current to provide an output level as a function of that output current, this output level being compared to a ramp signal, whereby a delayed version of the signal read from the data storage device is produced when the ramp signal is substantially equal to the output level. The ramp signal is generated by a ramp generator having a reactive impedance that is substantially identical to the reactive impedance of the variable oscillator, and that is charged when a signal is read from the data storage device.

10 Claims, 5 Drawing Sheets

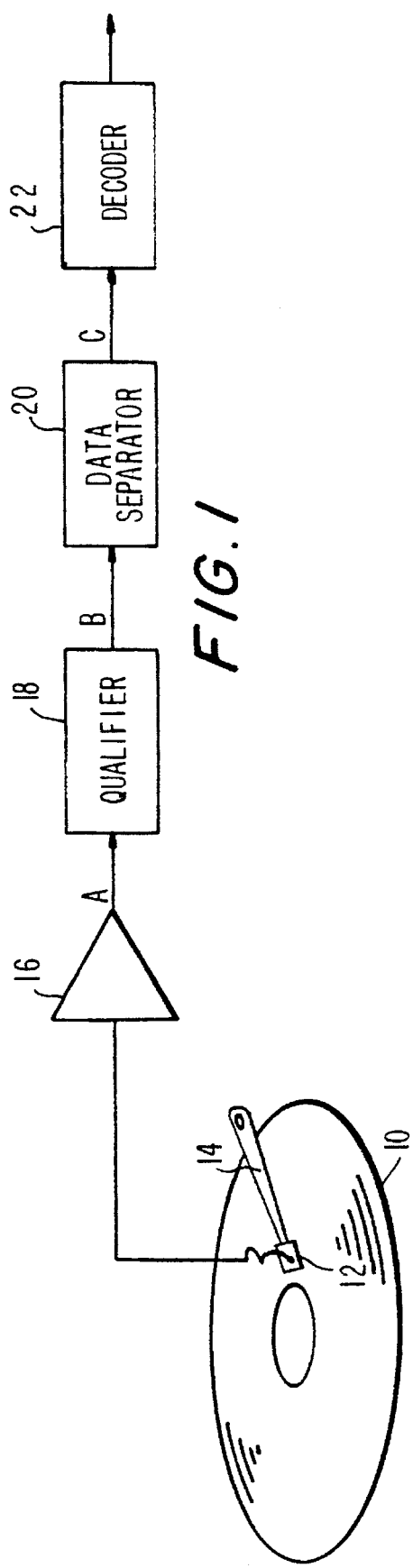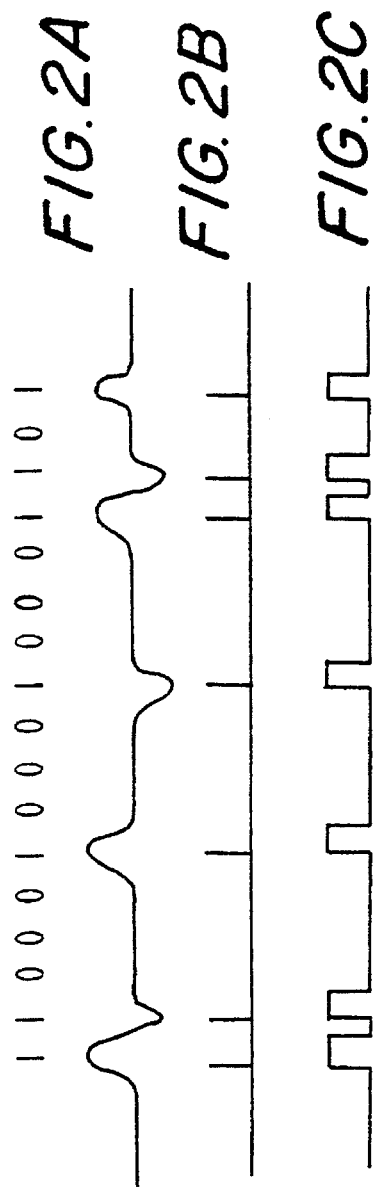

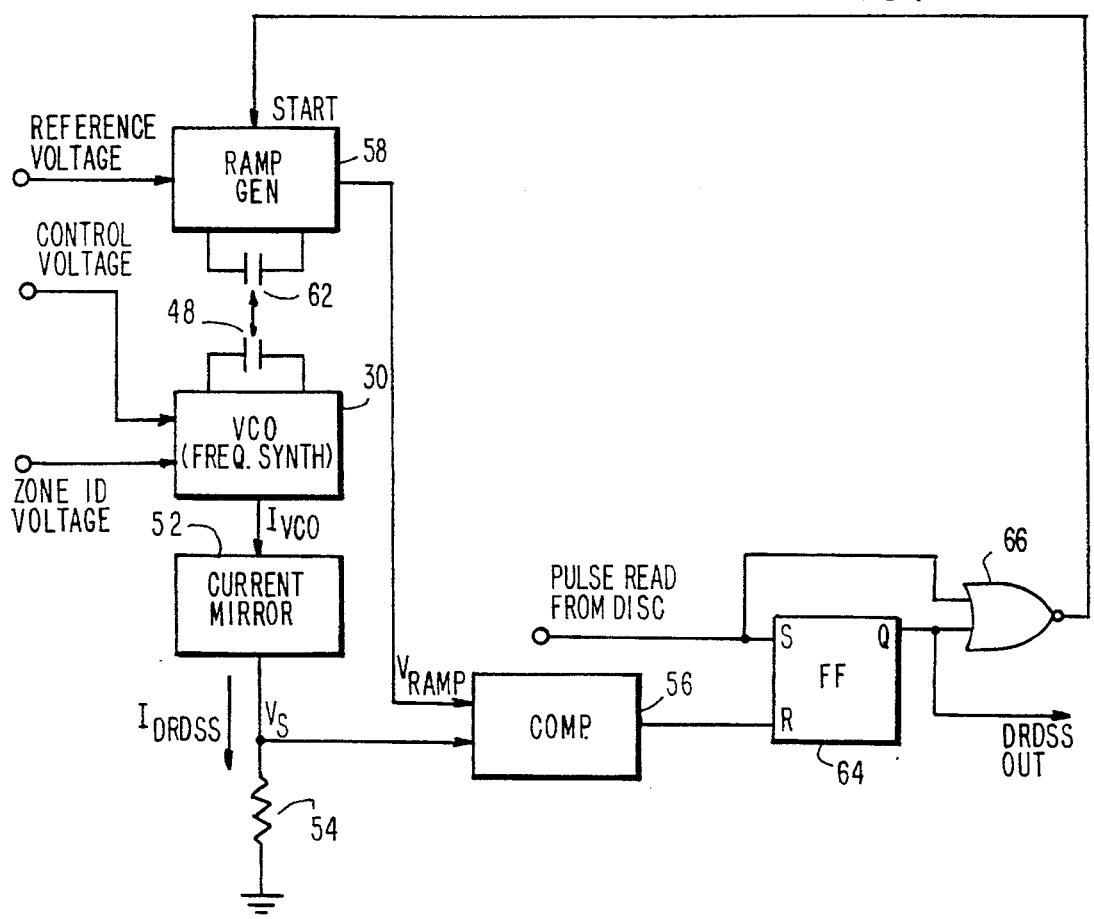

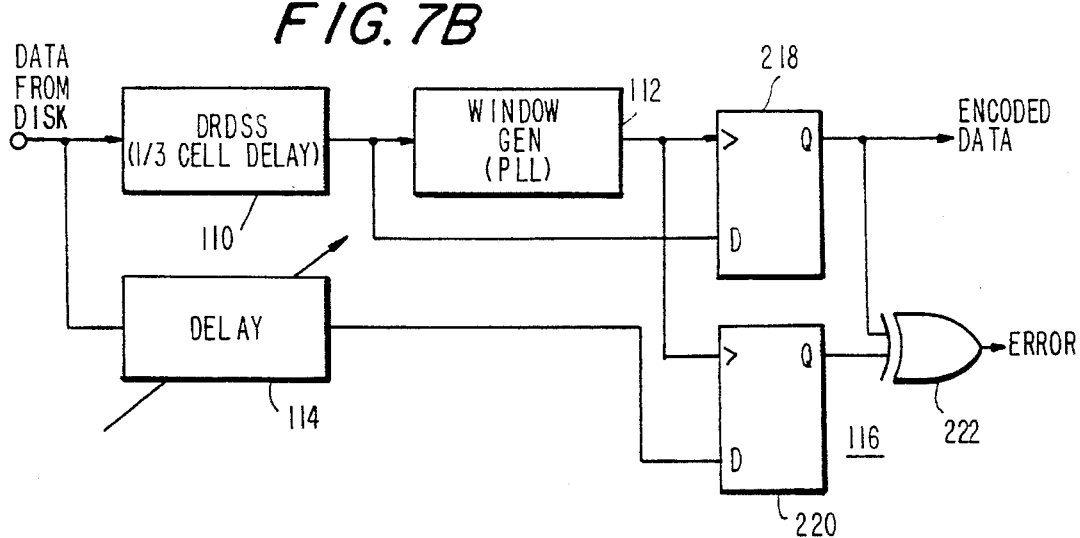
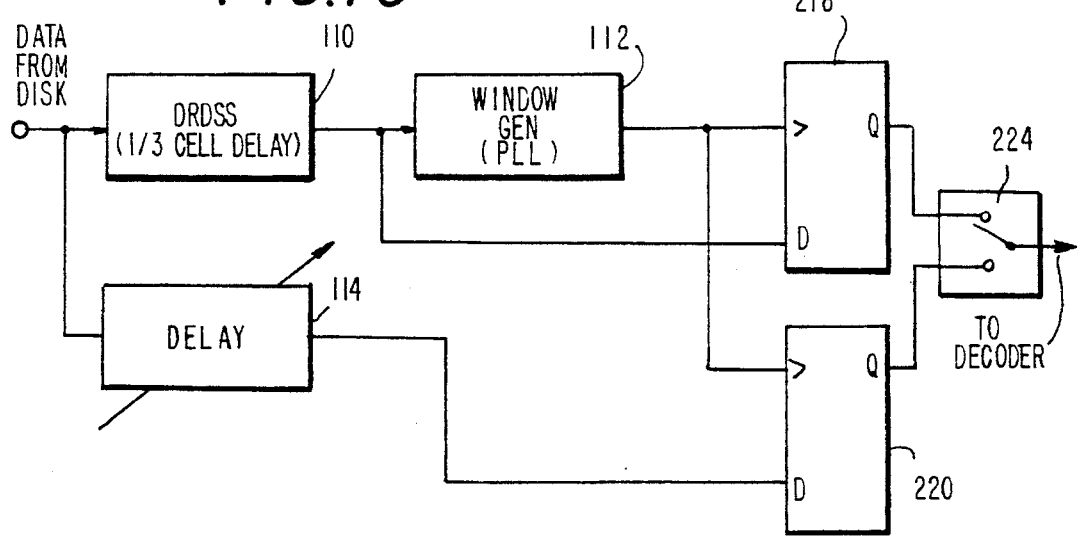

ced data pulse is
supplied to an anticipator, or delay circuit, formed as a delay
line having several taps. Depending upon the particular zone
from which the data pulse is recovered, a corresponding tap
VARIABLE DELAY CIRCUIT INCLUDING CURRENT MIRROR AND RAMP GENERATOR CIRCUITS FOR USE IN THE READ CHANNEL OF A DATA STORAGE DEVICE This application is a division of application Ser. No. 07/902,073, filed Jun. 22, 1993 pending.

BACKGROUND OF THE INVENTION

This invention relates to a variable delay circuit having particular application in a read channel for a data storage device and, more particularly, to a delayed read data single shot (DRDSS) circuit that imparts a variable delay to a data signal read from different zones on a data storage device.

It is conventional in reading data from a magnetic medium, such as the read channel of a hard disk drive, to sense a flux change during a recurring predetermined "window." If a flux change is present during that window, a "1" is assumed to be present and if no flux change is present, a "0" is assumed. A series of "1"s and "0"s are recorded as a succession of alternating flux changes. That is, a positive-going (or negative-going) flux change is recorded to represent a "1", and no flux change represents a "0". Usually, a flux change that is opposite in polarity to the previous flux change is recorded to represent a "1", even if the successive flux changes are separated by several "0"s. This is intended to minimize interbit interference, noise and phase shifts which could result in an erroneous interpretation of a detected flux change. For example, if successive bits are thought of as occupying respective bit cells (also referred to as data cells), the flux change which is expected during a particular bit cell may be sufficiently shifted, or time-delayed, as to be detected during the next-following bit cell; thus giving rise to erroneous detections.

Data generally is recorded in self-clocking codes which are used, during a read operation, to provide synchronization for the window generator which thereby produces the proper detection window during which flux changes are sensed. A data separator normally is provided in the read channel to recover the timing information inherent in the self-clocking coded data reproduced from the magnetic medium and to use this timing information to generate a read clock. It is common to employ a phase-locked loop (PLL) to generate this read clock and to separate, or synchronize, the data pulses read from the medium with this read clock. The synchronized data pulses then are compared to the aforementioned window to determine if a "1" or "0" is present in a bit cell.

However, a data separator, or synchronizer, cannot operate instantaneously. That is, the PLL of the data separator cannot operate in real time so as to follow instantaneously the shifts and jitter normally experienced in the data pulses as those pulses are reproduced from the storage medium. Consequently, to provide accurate data separation, that is, to determine if the reproduced data pulse falls within the window generated during a bit cell, it is common to delay the data pulse before it is compared to the window. Stated otherwise, the data pulse is delayed before being supplied to the PLL from which the window is generated. Typically, the delay imparted to the data pulse is on the order of one-half of a bit cell; and the delay circuit which is used to produce this delay has been described by those of ordinary skill in the art as a one-half cell delay, an anticipator, a variable bit cell delay, a one-third cell delay and a delayed read data single shot (DRDSS). This delay circuit is referred to herein as the DRDSS circuit, which is believed to be a more accurate description thereof.

Heretofore, the DRDSS circuit exhibited a fixed delay. This presented no difficulty because the recording schemes that had been used to record the data pulses relied upon a uniform, constant data clock, regardless of the particular track in which the data pulses were recorded. Typically, a data clock frequency was selected to record the data pulses with maximum bit density in the innermost track, and since the same data clock frequency was used to record data pulses in the outermost track, the latter were recorded with a much reduced bit density. To improve the recording density for disk media, a so-called constant bit density recording technique has been developed. In this technique, the disk medium is divided into several radial zones, with each zone having substantially the same bit density as all other zones. In the preferred implementation, the data clock frequency is increased from zone to zone in the radially outward direction. Thus, data recorded in the outermost zone exhibits a clock frequency that is greater than the data recorded in the innermost zone, and this maintains the same bit density from zone to zone.

When reproducing data that had been recorded in constant bit density format, the size, or duration, of a bit cell is smaller for the outermost zone than it is for the innermost zone. However, if the delay imparted to a reproduced data pulse by the DRDSS circuit remains constant, this delay is either too great for the data pulses reproduced from the outer zones or is too small for the data pulses reproduced from the inner zones. In either event, data pulse phase shifts attributed to the medium can create significant timing jitter in the data separator PLL, resulting in data errors. The phase detector normally included in the data separator may be subjected to noise in the event that a reproduced data pulse undergoes a large phase shift.

One proposal to adapt the data separator to the different clock frequencies used in zone bit recording, and thus to account for bit cells of different durations, is described in U.S. Pat. No. 4,894,734. There, the reproduced data pulse is supplied to an anticipator, or delay circuit, formed as a delay line having several taps. Depending upon the particular zone from which the data pulse is recovered, a corresponding tap of the anticipator is selected to provide the delayed data pulse. However, this proposal is generally unsatisfactory because the implementation of a multi-tap delay line is quite large and expensive. As the size of disk drive apparatus is reduced from generation to generation, there simply is no available capacity (or "real estate") to accommodate a multi-tap delay line. Moreover, this proposal contemplates a fixed delay for a given zone, even though the actual clock frequency that is recovered from that zone may differ from its nominal frequency. That is, thermal effects, age, drift and other inherent characteristics of the magnetic medium may result in an effective clock frequency of the reproduced data pulses that differs from the designed frequency. Consequently, the actual size of a bit cell may differ from the expected size and the delay provided at a particular tap thus may be too large or too small for that bit cell.

OBJECTS OF THE INVENTION

Therefore, it is an object of the present invention to provide an improved delay circuit which imparts a variable delay to data pulses reproduced from different zones of a data storage device, such as a record medium, which overcomes and avoids the drawbacks and disadvantages of the aforenoted proposal.

Another object of this invention is to provide a DRDSS circuit which is readily implemented as an integrated circuit and which provides a delay that is matched not only to the zone from which a data pulse is reproduced but also to the actual clock frequency of the reproduced data.

A further object of this invention is to provide window margining apparatus which incorporates the aforementioned DRDSS circuit, thus permitting the error rate of a disk drive to be determined easily and quickly.

Various other objects, advantages and features of the present invention will become readily apparent from the ensuing detailed description, and the novel features will be particularly pointed out in the appended claims.

SUMMARY OF THE INVENTION

In accordance with this invention, a DRDSS circuit is provided for use in a read channel that is operable to read signals recorded in different zones of a data storage device with respectively different clock frequencies, wherein the read channel is connectable to (or includes) a variable oscillator having a reactive impedance supplied with a charging current whose level corresponds to the clock frequency of the zone being read. A duplicator is coupled to the variable oscillator and produces an output current that is a substantially identical duplicate of the charging current to provide an output level as a function of that output current. The output level is compared to a ramp signal, and when the ramp signal is substantially equal to the output level, a delayed version of the signal read from the data storage device is produced. The ramp signal is generated by a ramp generator having a reactive impedance that is substantially identical to the reactive impedance of the variable oscillator, and is triggered in response to a signal read from the data storage device.

As an aspect of this invention, the variable oscillator and the ramp generator both are formed as a common integrated circuit; and the reactive impedance in each is comprised of a capacitor.

As another aspect, the variable oscillator includes an astable multivibrator having resistors, and the duplicator includes a reference resistor through which the output current flows, the reference resistor being matched to the astable multivibrator resistors. Advantageously, the astable multivibrator and the reference resistor are formed in a common integrated circuit.

As a further aspect of this feature of the invention, the duplicator comprises a current mirror circuit.

As yet another aspect, a bistate circuit, such as a flip-flop circuit, is triggered to a first state when a signal is read from the data storage device and is triggered to a second state to produce a delayed version of that signal when the ramp signal is substantially equal to the output level.

As another feature of this invention, the DRDSS circuit is incorporated into window margining apparatus which detects the occurrence within a window duration of a data pulse reproduced from a zone bit recorded data storage device. The delayed data pulse produced by the DRDSS circuit triggers a window pulse generator which supplies a window pulse to a detector that operates to detect if the reproduced data pulse occurs within the detection window. To effect the window margining feature, the reproduced data pulse is supplied to the detector by means of a variable delay which imparts a delay intended to shift the data pulse relative to the detection window in a direction such that phase errors present in the reproduced data pulse may cause the delayed data pulse to fall outside the window.

BRIEF DESCRIPTION OF THE DRAWINGS

The following detailed description, given by way of example, and not intended to limit the present invention solely thereto, will best be understood in conjunction with the accompanying drawings in which:

FIG. 1 is a partial schematic, partial block diagram of a read channel that is used to read data reproduced from a record medium, such as a hard disk drive;

FIGS. 2A–2C are waveform diagrams which represent the wave shapes of the signals produced at various locations in the read channel;

FIG. 4 is a block diagram of a preferred embodiment of the present invention;

FIGS. 5A–5D are waveform diagrams which are useful in understanding the operation of the embodiment shown in FIG. 4;

FIGS. 7A–7C are block diagrams of embodiments of window margining apparatus which incorporate the present invention.

DETAILED DESCRIPTION OF PREFERRED EMBODIMENTS

Figure 3:
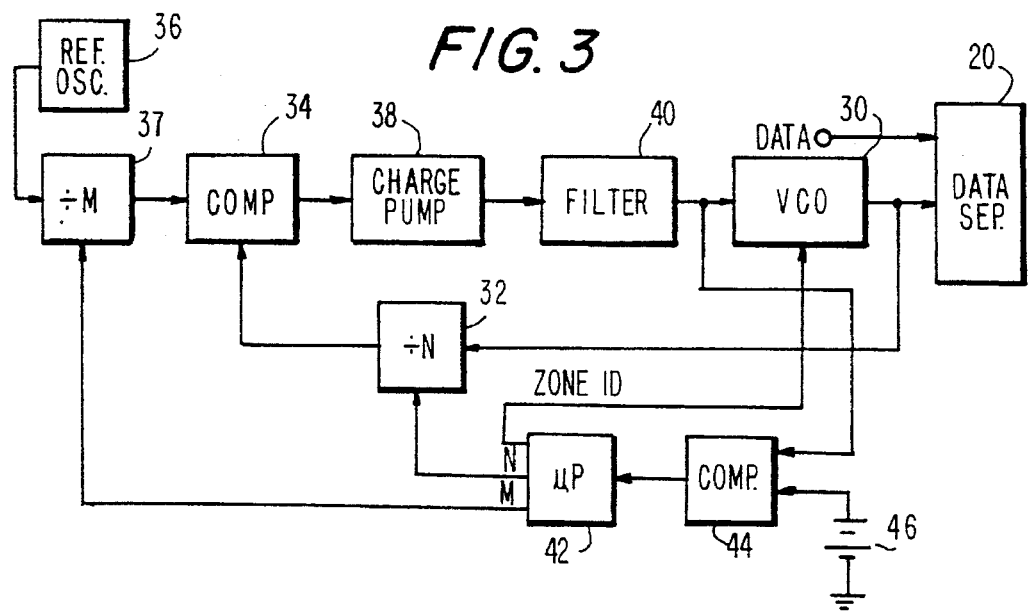
FIG. 3 is a block diagram of a frequency synthesizer that may be used for writing and reading data recorded in zone bit recording format.

Referring now to the drawings, and in particular to FIG. 1, there is illustrated a typical read channel used to recover data recorded on a record medium, such as a hard magnetic disk 10. It will be appreciated that only one surface of one disk is illustrated in FIG. 1; but in a practical embodiment, the disk drive apparatus includes several disks, each having a surface for recording data thereon. Data is reproduced by a head 12 which flies over the surface of disk 10, the head being positioned to a desired track by an actuator 14, such as a rotary actuator of a type known to those of ordinary skill in the art. In the aforementioned practical embodiment, the actuator is comprised of a stack of support arms to which respective heads (similar to head 12) are secured, each head cooperating with a surface of a respective disk to write or read data thereon. Although all of the heads are positioned simultaneously, only one head in the stack is actuated to carry out a write or read operation.

Head 12 is coupled to the read channel which is illustrated as being comprised of a read amplifier 16, a qualifier 18, a data separator 20 and a decoder 22. The data pulses reproduced from head 12 are referred to as "raw" data; and this raw data is amplified by read amplifier 16 to a level such that the data may be readily detected. FIG. 2A is a waveform representation of the amplified raw data produced by the read amplifier.

The amplified raw data from read amplifier 16 is coupled to qualifier 18 which operates to detect the positive and negative peaks in the raw data. It will be appreciated that the raw data, and particularly the peaks therein, represent flux changes that are produced when recording a "1". As is typical, successive flux changes, even though they may be separated by intervals of no change, undergo transitions of opposite polarities. Each flux change may occupy the duration of a flux cell which, for ease of understanding, may be thought of as being substantially equal to the duration of a bit cell. Thus, the amplified raw data shown in FIG. 2A may be expressed in binary notation as [11000100010001101]. The qualifier is adapted to detect a flux change and, thus, determine if a "1" or a "0" is being reproduced. Various implementations of qualifiers are known to those of ordinary skill in the art, and may include a peak detector. In the embodiment described herein, qualifier 18 is adapted to produce an output pulse in response to each detected positive or negative peak in the amplified raw data supplied thereto. FIG. 2B is a waveform representation of the pulses produced by qualifier 18 in response to the detection of the peaks in the raw data.

The output of qualifier 18 is coupled to data separator 20. The data separator also is known to those of ordinary skill in the art as a data synchronizer and is adapted to synchronize, or re-clock the pulses produced by qualifier 18 and thereby produce a synchronized pulse of predetermined duration within a bit cell. FIG. 2C is a waveform representation of the separated, or synchronized, data that is recovered from record medium 10. Typically, the data separator includes a phase-locked loop which operates to recover the timing information included in the qualified data pulses (such as those shown in FIG. 2B) and also to determine if a "1" or "0" is present during a bit cell duration. Of course, the bit cell duration is a function of the recovered timing information.

The output of data separator 20, that is, the synchronized pulses shown in FIG. 2C, are coupled to decoder 22 from which the code that was used for recording purposes, such as a conventional 1,7 code, is decoded. The decoded data in conventional "1" and "0" format is supplied from decoder 22 to further apparatus, such as to a computer system with which the disk drive apparatus is used.

When data is recorded on data storage disk 10 in different zones in accordance with constant bit density recording, the clock frequency used both for writing and reading data must be adjusted as head 12 moves from zone to zone. The write and read data clocks are generated by a frequency synthesizer of the type shown in FIG. 3. Here, the frequency synthesizer includes a phase-locked loop which incorporates a variable oscillator 30 whose oscillating frequency establishes the clock frequency associated with the data written on or read from data storage disk 10. The variable oscillator preferably is a voltage controlled oscillator (VCO); and the oscillating frequency thereof is determined not only by the operation of the phase locked loop but also by a microprocessor 42, to be described.

The phase locked loop is shown as a conventional PLL comprised of VCO 30, a frequency divider 32, a comparator 34, a charge pump 38 and a filter 40, all interconnected in a loop. Comparator 34 is adapted to compare the frequency and phase of respective signals supplied thereto and includes one input coupled to frequency divider 32 to receive a repetitive signal derived from VCO 30 and another input coupled to receive a reference repetitive signal produced by a reference oscillator 36. Preferably, to provide a stable repetitive reference signal, oscillator 36 is a crystal oscillator.

The output of comparator 34 is adapted to represent an error between the oscillating frequency of VCO 30 and the frequency of reference oscillator 36. Thus, frequency and phase errors between the reference signal and the clock frequency established by VCO 30 are produced by comparator 34. The comparator is coupled to charge pump 38 which operates to charge up or charge down filter 40 whose output is connected to VCO 30 and is adapted to supply a control voltage to the VCO. As the charge pump varies, so varies the control voltage. VCO 30 responds to changes in the control voltage to adjust the clock frequency derived therefrom. Thus, if the VCO operates at the same frequency and phase as the reference signal supplied to comparator 34 from reference oscillator 36, a constant control voltage is supplied to the VCO to assure a constant oscillating frequency.

Microprocessor 42 is coupled to VCO 30 and is adapted to supply a zone identifying signal to the VCO which acts as a "coarse" control. The microprocessor also supplies a dividing ratio to frequency divider 32 such that this ratio changes as the particular zone being accessed by head 12 changes. If frequency divider 32 is thought of a divide-by-N frequency divider, microprocessor 42 supplies the value N thereto. Thus, as the oscillating frequency of VCO 30 changes in response to a zone identifying voltage derived from microprocessor 42, the fact that the dividing ratio N likewise changes means that the frequency of the oscillating signal supplied to comparator 34 remains constant, even though the clock frequency changes. In this regard, to match the frequencies of the repetitive signals supplied to comparator 34, the dividing ratio M may be linked with the dividing ratio N and supplied to frequency divider 37 by microprocessor 42.

It will be appreciated that, at steady state operation, the control voltage supplied to VCO 30 by filter 40 is substantially equal to a nominal reference level. As a numerical example, this reference level may be on the order of about 2.7 volts. A comparator 44 is coupled to filter 40 and is adapted to compare the control voltage supplied to VCO 30 with the aforementioned nominal reference voltage level which is supplied as a reference voltage 46 by a suitable source. The output of comparator 44 is coupled to microprocessor 42 and is adapted to supply an indication to the microprocessor of the deviation of the VCO control voltage from this reference voltage over a period of time. Although random deviations are expected, long term deviations are not. Microprocessor 42 functions to determine such long term deviations and, if necessary, to modify the coarse control signal supplied thereby to VCO 30. That is, the zone identifying voltage supplied to the VCO may be adjusted as a function of such long term deviations. Nevertheless, if desired, comparator 44 may be omitted.

The operation of the frequency synthesizer shown in FIG. 3 is known to those of ordinary skill in the art. Briefly, during a data read operation from a particular zone, the coarse oscillating frequency of VCO 30 is set by microprocessor 42 to be nominally equal to the clock frequency associated with that zone. The microprocessor also sets the dividing ratios N and M of frequency dividers 32 and 37 such that these frequency dividers also are matched to the zone being read. Now, data pulses which are reproduced from data storage disk 10, such as the data pulses produced by qualifier 18 and shown in FIG. 2B, are supplied to data separator 20 (shown in both FIGS. 1 and 3). The clock signal produced by VCO 30 likewise is supplied to the data separator. The data separator includes a phase locked loop such that any phase deviations between the read clock signal produced by the VCO and the data pulses reproduced from the data storage disk are used in the data separator to adjust the oscillator therein, whereby synchronized data pulses are produced at the output of data separator 20.

Turning now to FIG. 4, there is illustrated a block diagram of a DRDSS circuit that may be used in data synchronizer 20 for delaying the data pulses read from data storage disk 10 by an amount determined by the particular zone from which those data pulses are read. The DRDSS circuit includes a duplicator circuit 52, a reference voltage generator 54, a comparator 56, a ramp generator 58 and a bistate circuit 64. Duplicator 52 is adapted to duplicate the current flowing through variable oscillator 30 included in the frequency synthesizer shown in FIG. 3. One embodiment of the variable oscillator is shown in greater detail below, and it will be appreciated that the frequency at which this circuit operates is determined by a reactive impedance 48 included therein, such as a capacitor, and by the current which acts as a source of charging current for the reactive impedance. This current is identified as $I_{VCO}$. The capacitor comprising reactive impedance 48 is fixed; and the current $I_{VCO}$ through the variable oscillator changes as the oscillating frequency changes. As mentioned above, the oscillating frequency of VCO 30 is determined by the zone identifying voltage supplied thereto from microprocessor 42 and the control voltage produced by filter 40. Hence, the oscillator current $I_{VCO}$ varies as the zone identifying voltage and the control voltage vary.

Duplicator 50, which is implemented by and referred to hereinafter as a current mirror circuit, is adapted to provide a substantially identical duplicate of the oscillator current $I_{VCO}$. This duplicated current $I_{DRDSS}$ thus mirrors the changes in the oscillator current. The current mirror circuit is coupled to reference voltage generator 54, shown herein as a resistor. As the mirrored current $I_{DRDSS}$ flows through resistor 54, an output voltage $V_3$ is produced thereacross; and it will be appreciated that this output voltage is a representation of the oscillating frequency of VCO 30. Thus, as the oscillating frequency changes, as when data pulses from different zones are recovered, output voltage $V_3$ changes in a similar manner.

Comparator 56 is coupled to resistor 54 and also to ramp generator 58 and is adapted to compare a ramp signal, or ramp voltage $V_{RAMP}$ generated by the ramp generator to the output voltage $V_3$ produced across resistor 54. The ramp generator includes a reactive impedance 62, preferably a capacitor, whose value is matched to the value of capacitor 48. In one embodiment, capacitors 48 and 62 are equal, and this is readily achieved by fabricating VCO 30 and ramp generator 58 in a common integrated circuit. As will be shown in greater detail in FIG. 6, the ramp generator also includes an inhibit circuit which, for example, short-circuits, or shunts, capacitor 62 so as to prevent the capacitor from charging (or, alternatively, from discharging) when a data pulse is not reproduced from data storage disk 10. This inhibit circuit normally is disabled or, stated otherwise, ramp generator 58 is enabled in response to a START signal generated when a data pulse is read from the data storage disk. When enabled, the ramp generator supplies comparator 56 with a ramp voltage $V_{RAMP}$, to be described.

As depicted in FIG. 4, ramp generator 58 is supplied with a reference voltage, such as an operating voltage or, alternatively, such as reference voltage 46 (FIG. 3) from which the ramp voltage $V_{RAMP}$ is generated. As mentioned above, the control voltage supplied to VCO 30 by filter 40 is nominally equal to this reference voltage.

Comparator 56 may be a conventional voltage comparator and is adapted to produce an output pulse when the level of the ramp voltage $V_{RAMP}$ is equal to the level of output voltage $V_3$ produced across resistor 54. The output of comparator 56 is supplied as a reset signal to bistate circuit 64 from which the delayed data pulse is produced. Assuming that bistate circuit 64 is a simple set/reset flip-flop circuit, the set input thereof is adapted to be supplied with the data pulse recovered from data storage disk 10, such as the data pulse produced by qualifier 18 and shown in FIG. 2B, and the Q output thereof is used as the DRDSS output from which the delayed data pulse is derived. In addition, the Q output is coupled by way of a NOR gate 66 to the inhibit circuit of ramp generator 58 to supply the aforementioned START signal thereto. Another input of NOR gate 66 is connected to receive the data pulse recovered from the data storage disk.

Before describing one circuit implementation of VCO 30 and ramp generator 58, a brief description of the manner in which the DRDSS circuit shown in FIG. 4 operates is provided with reference to the waveform diagrams illustrated in FIGS. 5A–5D. VCO 30 operates to generate a read clock signal whose frequency is determined nominally by the zone identifying voltage derived from microprocessor 42 (FIG. 3). Let it be assumed that the phase locked loop in which VCO 30 is provided operates in its normal manner such that the clock frequency generated by VCO 30 is synchronized with the timing information inherent in the data pulses recovered from data storage disk 10. Accordingly, the control voltage supplied to the VCO by filter 40 serves to adjust the oscillating frequency, as necessary. The VCO current $I_{VCO}$ controls the charging of capacitor 48 and also provides an accurate representation of the read clock frequency. This VCO current $I_{VCO}$ is mirrored by current mirror circuit 52 to supply resistor 54 with a mirrored current $I_{DRDSS}$. Consequently, output voltage $V_3$, represented by the broken line in FIG. 5B, is an accurate indication of the read clock frequency. As this read clock frequency changes, such as when data from a different zone is being read, the output voltage $V_3$ changes in a corresponding manner.

Initially, let it be assumed that ramp generator 58 is inhibited. Let it be further assumed that at time $t_0$, a data pulse is read from disk 10, such as shown in FIG. 5A. This data pulse is supplied to the set input of flip-flop circuit 64 and also to NOR gate 66. Consequently, a START signal is supplied to ramp generator 58 by the NOR gate, thus enabling the ramp generator to generate ramp voltage $V_{RAMP}$ shown in FIG. 5B. It is assumed herein that the ramp voltage is a decreasing voltage, but it will be appreciated that, as an alternative, and if desired, the ramp voltage may be an increasing voltage. Also, flip-flop circuit 64 is set in response to the pulse read from the data storage disk at time $t_0$, as represented by FIG. 5D.

When the level of the ramp voltage $V_{RAMP}$ reaches the output voltage level $V_3$, comparator 56 produces an output pulse, such as the pulse produced at time $t_1$ shown in FIG. 5C. This output pulse resets flip-flop circuit 64, as shown in FIG. 5D, and the negative transition, or falling edge, of the signal produced at the Q output of the flip-flop circuit is used as the delayed data pulse. When the flip-flop circuit is reset, NOR gate 66 supplies an inhibit signal to ramp generator 58, thus resetting the ramp voltage $V_{RAMP}$ to its initial value, as shown in FIG. 5B. The DRDSS circuit shown in FIG. 4 now is prepared to respond to the next data pulse read from data storage disk 10.

Figure 6:
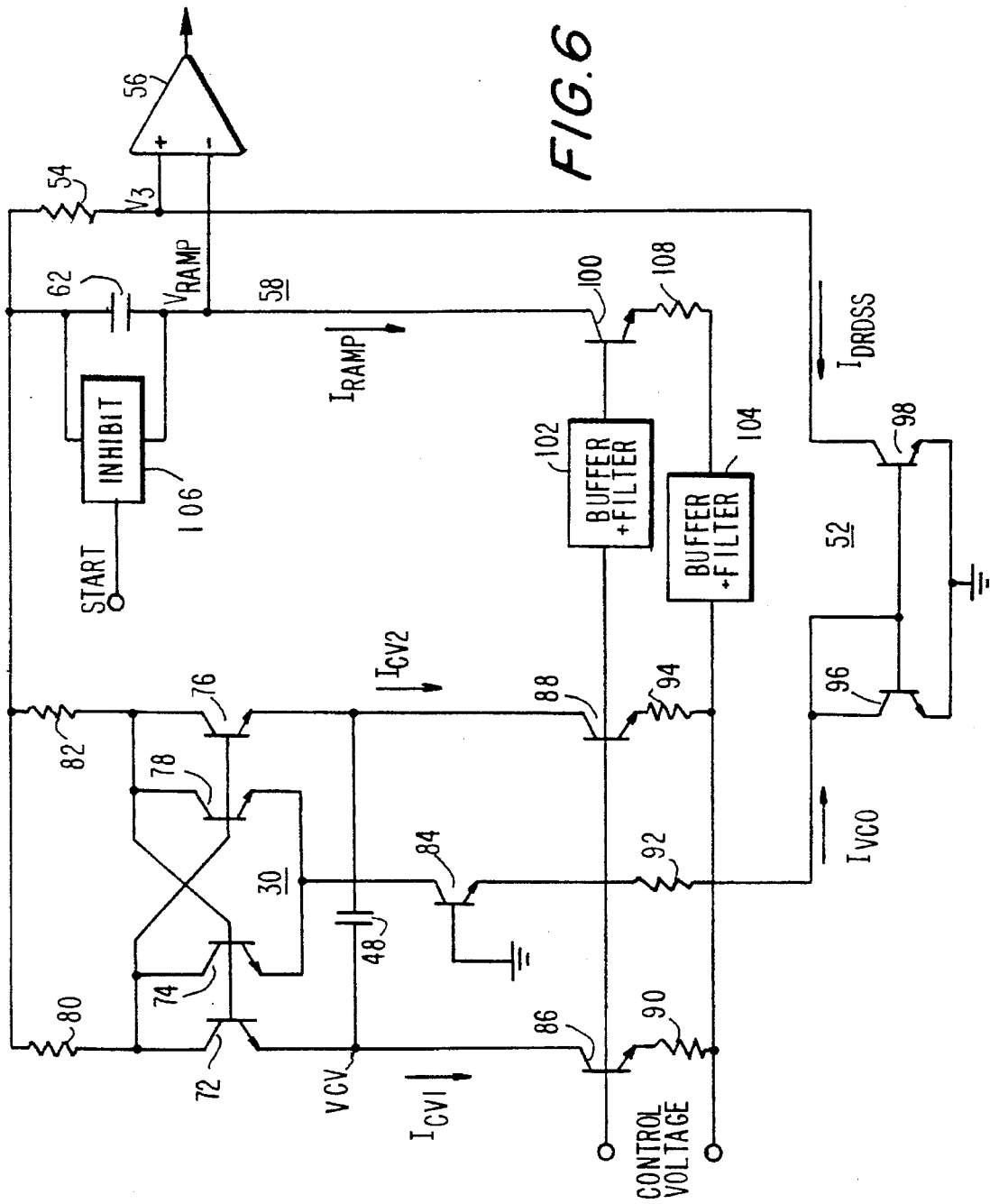
FIG. 6 is a schematic diagram of one embodiment of the DRDSS circuit in accordance with the present invention.

Turning now to FIG. 6, there is a schematic illustration of one embodiment of VCO 30, current mirror circuit 52 and ramp generator 58. VCO 30 is illustrated as an astable multivibrator having cross-coupled transistor pairs 72, 74 and 76, 78. Although the transistors are illustrated as bipolar transistors, it will be appreciated that they may be MOS devices, if desired.

The emitter circuits of cross-coupled transistors 72 and 76 are connected by capacitor 48. The respective emitter circuits also are coupled through current source transistors 86 and 88, respectively, these transistors having common-connected base electrodes adapted to receive the control voltage produced by filter 40. The emitter circuits of transistors 86 and 88 are connected to a common junction by way of respective emitter resistors 90 and 94.

The collector circuits of cross-coupled transistors 72 and 76 are coupled to a suitable source of operating potential (not shown)-by way of collector resistors 80 and 82.

Cross-coupled transistors 74 and 78, whose base-collector circuits are connected in common with transistors 72 and 76, respectively, have their emitter electrodes connected to a current source transistor 84 whose emitter electrode is coupled to the aforementioned common junction by a resistor 92. This common junction is coupled to current mirror circuit 52 which is illustrated as transistors 96 and 98 whose base-emitter circuits are connected in parallel, and transistor 96 is connected in diode configuration. The collector-emitter circuit of transistor 98 is coupled to resistor 54 which, in turn, is connected to the aforementioned source of operating potential. The collector of transistor 98 also is coupled to one input of comparator 56.

Ramp generator 58 is comprised of capacitor 62 connected in series with a resistor 108 by way of the collector-emitter circuit of a transistor 100. The control voltage that is supplied to VCO 30 by filter 40 also is coupled to the base electrode of transistor 100 by way of a buffer and filter 102. The emitter electrode of this transistor is connected by way of resistor 108 and a buffer and filter 104 to the aforementioned common junction which is coupled to current mirror circuit 52.

Capacitor 62 of ramp generator 58 is connected in shunt with an inhibit circuit 106 adapted to be supplied with the aforementioned START signal that is produced when a data pulse is read from data storage disk 10.

In the embodiment illustrated in FIG. 6, the resistance values of emitter resistors 90, 94 and 108 are equal. This is readily achieved by fabricating the illustrated circuit in a common integrated circuit. That is, VCO 30, current mirror circuit 52 and ramp generator 58 are formed as an integrated circuit.

Additionally, in this embodiment the resistance values of resistors 80 and 82 are equal, and this value is one-half the resistance of resistor 54.

To provide a delay of the data pulse which matches the zone from which that pulse is reproduced and, thus, the clock frequency associated with that zone, the time constant of ramp generator 58 should match the time constant of VCO 30. This is readily achieved by fabricating the VCO and the ramp generator in a common integrated circuit. Moreover, it will be appreciated that there is a relationship between the time constant of the VCO, the time constant of the ramp generator, the VCO current $I_{VCO}$ and the mirrored current $I_{DRDSS}$ which determines the output voltage $V_3$. For example, if the capacitance of capacitor 48 equals that of capacitor 62 ($C_{48}=C_{62}$) and if the resistances of resistors 80, 82 and 54 are represented as $R_{80}=R_{82}=R_{54}/2$, then the mirrored current is equal to the VCO current ($I_{DRDSS}=I_{VCO}$). However, if $C_{62}=2C_{48}$, then $I_{DRDSS}=I_{VCO}/2$.

In the circuit illustrated in FIG. 6, the current $I_{CV1}$ flowing through transistor 86 is determined by the voltage applied to the base of this transistor. Likewise, as seen from this circuit configuration, the current $I_{CV2}$ flowing through transistor 88 also is determined by this voltage. Transistors 86 and 88 are substantially identical and resistors 90 and 94 also are substantially identical, as is readily attained by integrated circuit fabrication, such that $I_{CV1}=I_{CV2}$. Now, if transistor 100 matches transistors 86 and 88 and if resistor 108 is equal to each of resistors 90 and 94, then, since the same control voltage is applied to transistor 100, the current $I_{RAMP}$ flowing therethrough is equal to the current flowing through transistor 86 or through transistor 88. That is, $I_{RAMP}=I_{CV1}=I_{CV2}$. It is appreciated that currents $I_{CV1}$ and $I_{CV2}$ establish the charging voltage of capacitor 48 and current $I_{RAMP}$ is the charging current of capacitor 62. Hence, the charging current of VCO 30 is, in this example, equal to the charging current of ramp generator 58. More generally, the charging currents need not be equal; but they should exhibit a fixed relationship.

As mentioned above, to provide a proper match of the time delay imparted by the DRDSS circuit to the oscillating frequency of VCO 30, thereby adjusting the delay imparted to the reproduced data pulse as the zone from which that pulse is reproduced changes, output voltage $V_3$ should match the oscillating frequency of the VCO. Now, the oscillating frequency of the VCO is determined by the rate at which capacitor 48 charges and discharges and this rate $\Delta T$ may be expressed generally as $\Delta T=C\{V/I\}$. When this general equation is applied to capacitor 48 shown in FIG. 6, the oscillation period of the capacitor may be expressed as:

$$C_{48} \times \frac{(2 \times I_{VCO} \times R_{80}) \times 2}{I_{CV1}}$$

When the foregoing expression is compared to the general charge/discharge equation, it is seen that $\Delta V=2\times I_{VCO}\times R_{80}$, indicating that a complete oscillating cycle $\Delta T$ requires current to flow in one direction and then the other through capacitor 48.

This voltage change $\Delta V$ across capacitor 48 is equal to the decrease in the ramp voltage $V_{RAMP}$ which establishes the time delay of the DRDSS circuit. Stated otherwise, assuming that the initial voltage level of the ramp voltage $V_{RAMP}$ is equal to the operating voltage (which may be designated $V_{CC}$), as shown in FIG. 5B, when this ramp voltage changes by the amount $\Delta V$, the time duration for this change to occur is matched to the oscillating frequency of VCO 30. This is because $I_{CV1}=I_{CV2}=I_{RAMP}$ and capacitors 48 and 62 are matched.

Now, to determine when $V_{RAMP}$ has been reduced by the quantity $\Delta V$, it is compared to the output voltage $V_3$, wherein $V_3=V_{CC}-\Delta V$. Accordingly, $\Delta V=I_{DRDSS} R_{54}$; and from the previous discussion, it is recalled that $\Delta V=2I_{VCO} R_{80}$. Since current mirror circuit 52 establishes that $I_{DRDSS}=I_{VCO}$, it follows that $R_{80}=R_{54}/2$; and since the collector resistors of the astable multivibrator which comprises VCO 30 are equal, $R_{80}=R_{82}=R_{54}/2$.

It will be recognized that the charging current $I_{CV1}$ for capacitor 48 depends upon the voltage difference between the control voltage supplied to transistor 86 and the voltage supplied to the base of transistor 84. For simplification, it is assumed herein that the base of transistor 84 is supplied with ground potential and, thus, the charging current $I_{CV1}$ is a function of the control voltage. It is further assumed that this control voltage is a composite of the control voltage produced by, for example, filter 40 and the zone identifying voltage derived from microprocessor 42 shown in FIG. 3. Thus, as the oscillating frequency of the VCO is set for different zones, the value of charging current $I_{CV1}$ and, thus, the value of VCO current $I_{VCO}$ is adjusted accordingly. As this current value changes, the mirrored current $I_{DRDSS}$ likewise changes. In addition, the current $I_{RAMP}$ through ramp generator 58 also changes and this varies the slope of the ramp signal shown in FIG. 5B. As a result, the delay imparted by the DRDSS circuit is adjustable and is matched to the oscillating frequency of variable oscillator 30.

From the foregoing, it is seen that the voltage at which the discharging of capacitor 62 terminates is established by output voltage $V_3$, and this is matched to the peak-to-peak oscillating voltage $\Delta V$ across capacitor 48. It is also seen that capacitors 48 and 62 are matched (in one example, $C_{48}=C_{62}$ and in another $C_{48}=2C_{62}$) and the charging current $I_{CV1}$ for capacitor 48 is matched to the charging current $I_{RAMP}$ of capacitor 62. Thus, the time delay of the DRDSS circuit is accurately matched to and closely follows the oscillating frequency of VCO 30. This oscillating frequency defines the read clock rate and the bit cell duration. Thus, as the read clock rate varies, as when data pulses from different zones are reproduced, the delay imparted to the read pulse is adjusted to match this change in the read clock rate.

The present invention is particularly useful not only in a data read operation but also in a window margining operation. As is known to those of ordinary skill in the art, window margining is a technique that predicts the error rate of a data storage device, particularly a magnetic disk drive. Typically, and as has been assumed and discussed in detail above, a data pulse reproduced from data storage disk 10 is discriminated by examining its value during a predetermined window. In this manner, "1"s and "0"s can be discriminated. Of course, if there are defects in the record medium or errors present in the head or in the read channel, the reproduced pulses may be subjected to phase shifts whereby some of those pulses occur outside the detecting window. The number of such erroneously detected (or undetected) pulses establishes, at least in part, the error rate of the disk drive device. Typically, disk drives having error rates worse than $10^{-10}$ are not acceptable. Window margining provides a relatively simple and effective technique for predicting the error rate.

A conventional window margining arrangement supplies data pulses reproduced during a test mode to the usual window detector of the data separator in the read channel through a variable delay circuit. Typically, the data pulses are recorded in a test pattern designed to enhance the probability of interbit interference, resulting in phase shifts. The variable delay circuit is adapted to shift the position of the reproduced pulse relative to the detecting window, and this has the effect of narrowing that window and thus increasing the probability of an error. Ideally, the data pulse is reproduced at the center of the detecting window; but the variable delay circuit shifts the position of the pulses to one side of the window. Of course, as the deliberate delay imparted by this variable delay circuit increases, the likelihood of shifting the pulse outside the window increases. The predicted error rate of the disk drive is determined by the amount of delay which must be imparted to the reproduced pulses before a significant amount of errors is detected. There is a statistical relationship between the amount of delay and the error rate; and this statistical relationship forms no part of the present invention.

The typical window margining arrangement operates satisfactorily to predict the error rate of a disk drive in which data is recorded with a uniform, constant clock rate. However, when zone bit recording is used, the typical window margining arrangement is less than satisfactory because the detecting window is triggered by the reproduced pulse after that pulse has been delayed by a fixed amount (the aforementioned ⅓ cell delay, or anticipator) which may not be matched to the actual duration of the bit cell (or clock rate) of the reproduced pulse. Consequently, when a pulse is reproduced from different zones during the window margining test, the detected window may already be shifted relative to that pulse. As a result, an excess number of errors may be detected improperly or, alternatively, a lesser number of errors may be sensed, depending upon whether the shift in the detected window caused by the fixed ⅓ cell delay is a leading or lagging shift relative to the reproduced pulse.

Figure 7A:
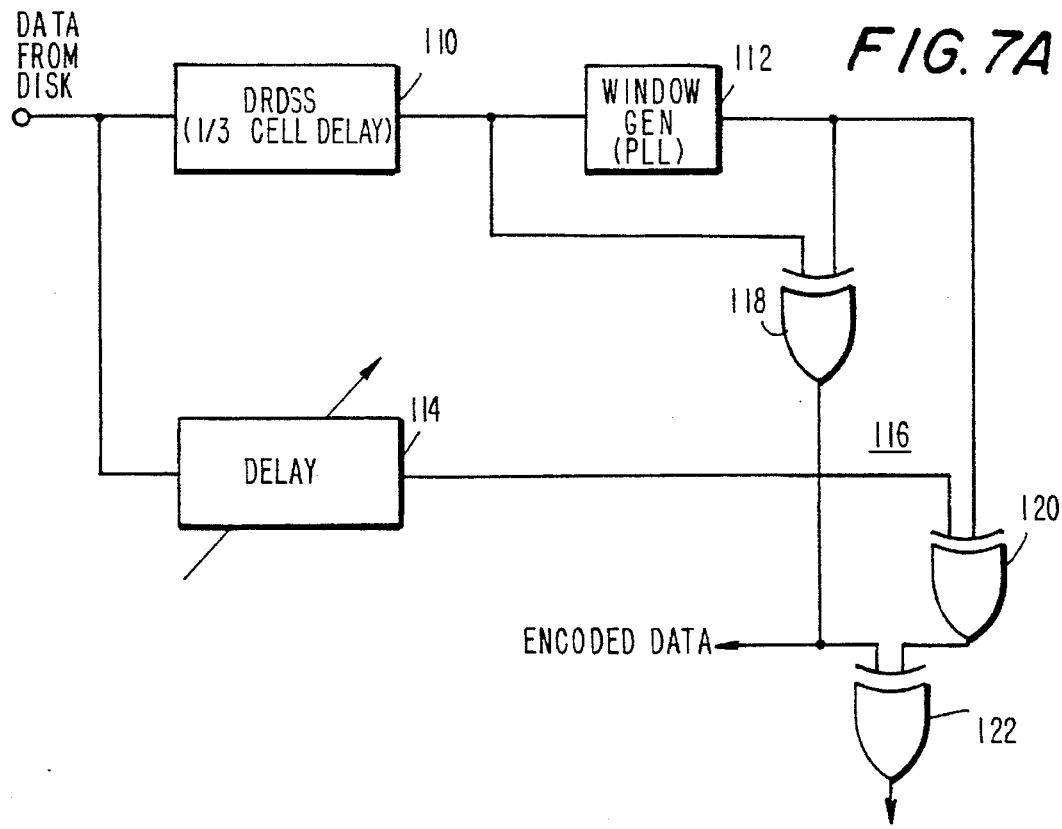

This problem is overcome by using the DRDSS circuit of the present invention for window margining. An example of a window margining arrangement which incorporates this invention is illustrated in FIG. 7A. Here, pulses reproduced from data storage disk 10 during the window margining operation are supplied to a window generator 112 by way of DRDSS circuit 110. The window generator, which may comprise the phase locked loop included in data separator 20 shown in FIGS. 1 and 3, is adapted to generate a detecting window of predetermined duration in response to the delayed version of the reproduced pulse as supplied thereto by DRDSS circuit 110.

The pulses reproduced from the data storage disk also are supplied through a variable delay circuit 114 to a comparator 116 wherein the variably delayed pulses are compared to the detecting window generated by window generator 112. If the delayed pulses occur within the detecting window, no error is indicated. However, if a delayed pulse occurs outside this detecting window, comparator 116 generates an output error indication.

Comparator 116 is comprised of a first comparator 118 coupled to DRDSS circuit 110 and window generator 112 and is adapted to provide actual discrimination of the pulse, that is, comparator 118 determines if a "1" or a "0" is reproduced from data storage disk 10. Comparator 116 also includes a second comparator 120 coupled to window generator 112 and to variable delay circuit 114 and is adapted to compare the variably delayed pulse to the detecting window. A third comparator 122 is coupled to comparators 118 and 120 and is adapted to determine if the detection provided by comparator 120 is equal to the detection provided by comparator 118. If these two detection indications are equal, it is concluded that the reproduced pulse, as delayed by delay circuit 114, nevertheless falls within the detecting window generated by window generator 112. However, if these two detection indications are not equal, an error indication is provided by comparator 122. In the embodiment of FIG. 7A, each of comparators 118, 120 and 122 is constructed as an EXCLUSIVE OR circuit.

If a "1" is reproduced from the data storage disk, comparator 118 may produce an output "0". If, however, because of the delay imparted to this reproduced "1" by delay circuit 114 the delayed pulse occurs outside the detecting window, comparator 120 may produce an output "1". Comparator 122 thus is supplied with a "0" from comparator 118 and a "1" from comparator 120, thus producing a "1" as an output error indication.

Similarly, if the next-following bit cell reproduced from data storage disk 10 contains a "0", comparator 118 produces an output "1". However, if the delay provided by delay circuit 114 is such that the preceding "1" has been sufficiently delayed so as to occur during the present detecting window, comparator 120 produces an output "0". Comparator 122 now receives a "1" from comparator 118 and a "0" from comparator 120, thus producing the "1" output error indication. Comparator 118 thus may be thought of as providing a reference to which the output of comparator 120 is compared. If the discriminated data produced by comparator 120 is equal to this reference, no error indication is provided. However, if the discriminated data differs from the reference, comparator 122 produces an output error indication.

It is seen that if the window margining apparatus shown in FIG. 7A is used in the read channel during a normal read operation, the output of comparator 118 provides an inverted version of the actual encoded data reproduced from data storage disk 10.

As mentioned above, window generator 112 includes the phase-locked loop of data separator 20. This phase-locked loop may be matched to the particular zone from which pulses are reproduced such that the detecting window is reduced in duration when a zone having data recorded therein with a higher clock rate is read; and the detecting window duration is increased when a zone having data recorded with a lower clock rate is read. This may be easily achieved by matching the charging current of the variable oscillator included in the window generator phase-locked loop (e.g. the charging current $I_{VCO}$ included in the variable oscillator of the window generator) to the charging current of VCO 30 included in the frequency synthesizer. It is recognized that this matching of the charging currents is easily attained by a current mirror circuit similar to current mirror circuit 52 (shown in FIG. 6). Moreover, the variable oscillator of the window-generator phase-locked loop preferably is of the same configuration as VCO 30 shown in FIG. 6.

Another example of window margining apparatus is illustrated in FIG. 7B, which is seen to be similar to the embodiment of FIG. 7A and wherein EXCLUSIVE OR circuits 118 and 120 are replaced by clocked flip-flop circuits 218 and 220, such as D-type flip-flop circuits. In particular, the data, or D input of flip-flop circuit 218 is coupled to DRDSS circuit 110 and the clock input of the flip-flop circuit is coupled to receive the window pulse generated by window generator 112. Similarly, the data input of flip-flop circuit 220 is coupled to variable delay circuit 114 and the clock input of this flip-flop circuit is coupled to window generator 112. The outputs of flip-flop circuits 218 and 220, namely the Q outputs thereof, are coupled to an EXCLUSIVE OR circuit 222, which may be substantially the same as aforedescribed EXCLUSIVE OR circuit 122.

As is known to those of ordinary skill in the art, each of flip-flop circuits 218 and 220 responds to a transition in the window pulse supplied to its clock input, such as a negative transition (i.e. the trailing edge of the window pulse), to produce at its Q output a "1" or "0" level, depending on the level of the delayed pulse then being applied to its data input. Thus, in operation, if a delayed pulse produced by DRDSS circuit 110 falls within the detecting window generated by window generator 112, flip-flop circuit 218 is set to produce a "1" at its Q output. But, if the delay imparted by variable delay circuit 114 to the pulse reproduced from data storage disk 10 shifts this pulse so that it occurs outside the detecting window, flip-flop circuit 220 remains reset and a "0" is produced at its Q output. Consequently, EXCLUSIVE OR circuit 222 is supplied with a "1" and a "0" at its respective inputs to produce a "1" as an output error indication.

It will be seen that this same error indication is produced if a "0" is reproduced from data storage disk 10 and if the delay imparted by variable delay circuit 114 is sufficient to shift a preceding "1" into the present detecting window. In that event, flip-flop circuit 218 is reset by the "0" produced by DRDSS circuit 110 to produce a "0" at its Q output and flip-flop circuit 220 is set by the delayed, preceding "1" to produce a "1" at its Q output. Hence, EXCLUSIVE OR circuit 222 produces the "1" output error indication.

Flip-flop circuit 218 thus may be thought of as providing a reference to which the output of flip-flop circuit 220 is compared. As in the FIG. 7A embodiment, if the discriminated data produced by flip-flop circuit 220 is equal to this reference, no error indication is provided; but, if the discriminated data differs from the reference, an output error indication is produced by the EXCLUSIVE OR circuit.

A further example of window margining apparatus is illustrated in FIG. 7C, which is seen to be substantially the same as the embodiment shown in FIG. 7B, except that EXCLUSIVE OR circuit 222 is replaced by a selector 224, shown schematically as a switch. The selector may comprise a multiplexer circuit and is adapted to couple to, for example, decoder 22 (FIG. 1) either the synchronized recovered data produced at the Q output of flip-flop circuit 218, or the "margined" data produced at the Q output of flip-flop circuit 220. Preferably, selection control is effected by the user, depending upon whether data is read from the data storage disk during a data read operation or during a window margining operation.

While the present invention has been particularly shown and described with reference to preferred embodiments, it will be readily appreciated by those of ordinary skill in the art that various changes and modifications may be made without departing from the spirit and scope of the invention. For example, the particular numerical examples of the relationships of the resistors and capacitors included in VCO 30 and ramp generator 58 may be varied; and one need not strictly adhere to the particular numerical examples described above. Furthermore, although a relatively simple, straightforward and effective circuit configuration has been shown in FIG. 6, those of ordinary skill in the art will recognize that other circuit implementations may be used as VCO 30 and ramp generator 58. Still further, although the adjustable delay circuit which has been described herein as a DRDSS circuit has been designed primarily for use with a magnetic disk drive system, it will be appreciated that this delay circuit admits of other uses and applications and it is intended that this delay circuit not be limited for use solely with a disk drive. Moreover, while the delay imparted by the DRDSS circuit preferably is matched to the clock rate of variable oscillator 30, it will be appreciated that the DRDSS circuit may be matched to other clock generators adapted to generate timing information, whether or not such clock generators are included in a frequency synthesizer of the type shown in FIG. 3. It is specifically intended that the present invention not be limited by or for use with this frequency synthesizer.

Therefore, it is intended that the appended claims be interpreted as including the specific embodiments described herein, those modifications which have been mentioned heretofore and all equivalents thereto.

What is claimed is:

1. A delayed read data single shot (DRDSS) circuit for use in a read channel operable to read signals recorded in different zones of a data storage device with respectively different clock frequencies, the read channel including variable oscillating means having a reactive impedance supplied with an impedance charging current whose level corresponds to the clock frequency of a zone being read, said DRDSS circuit being adapted to delay by different amounts signals read from different zones and comprising:

duplicating means coupled to said variable oscillating means for producing an output current that is a substantially identical duplicate of said impedance charging current;

voltage generating means coupled to said duplicating means for providing an output voltage having a level determined by said output current;

ramp generating means having a reactive impedance matched to the reactive impedance of said variable oscillating means and responsive to a signal read from said data storage device to begin charging said reactive impedance in said ramp generating means for generating a ramp signal;

comparator means for comparing said ramp signal to said output voltage level to produce an output signal when said ramp signal is substantially equal to said output voltage level; and delayed output pulse generating means to initiate an output pulse when said signal is read from said data storage device and to terminate said output pulse when said comparator means produces said output signal.

2. The DRDSS circuit of claim 1 wherein said duplicating means comprises a current mirror circuit.

3. The DRDSS circuit of claim 1 wherein the reactive impedance in said variable oscillating means and in said ramp generating means comprises capacitance means.

4. The DRDSS circuit of claim 3 wherein said variable oscillating means and said ramp generating means both are formed in a common integrated circuit.

5. The DRDSS circuit of claim 1 wherein said voltage generating means comprises a reference resistor for generating a reference voltage in response to said output current and to which said ramp signal is compared.

6. The DRDSS circuit of claim 5 wherein said variable oscillating means includes astable multivibrator means having resistors; and wherein said reference resistor is matched to the astable multivibrator resistors.

7. The DRDSS circuit of claim 6 wherein the astable multivibrator means and the reference resistor are formed in a common integrated circuit.

8. The DRDSS circuit of claim 1 wherein said delayed output pulse generating means comprises bistate means triggered to a first state in response to the signal read from said data storage device and triggered to a second state when said comparator means produces said output signal.

9. The DRDSS circuit of claim 8 further comprising inhibit means coupled to said ramp generating means for inhibiting said reactive impedance therein from being charged when said bistate means is in said second state.

10. The DRDSS circuit of claim 1 further comprising a source of reference voltage coupled to said ramp generating means for charging the reactive impedance therein; a source of control voltage coupled to said variable oscillating means for supplying a control voltage thereto nominally equal to the reference voltage for controlling the oscillating rate of said variable oscillating means; and means for changing said control voltage.

* * * * *